United States Patent [19]

West et al.

[11] Patent Number: 5,000,893
[45] Date of Patent: Mar. 19, 1991

[54] METHOD OF MAKING A FOAM INSULATED WATER HEATER

[75] Inventors: Eugene L. West, Grand Rapids; Robert J. Marcinkewicz, Plainwell, both of Mich.

[73] Assignee: Bradford-White Corporation, Philadelphia, Pa.

[21] Appl. No.: 743,421

[22] Filed: Jun. 11, 1985

[51] Int. Cl.⁵ .............................................. B29C 67/22
[52] U.S. Cl. .................. 264/46.5; 264/45.2; 264/469
[58] Field of Search ............... 264/45.2, 46.5, 46.9

[56] References Cited

U.S. PATENT DOCUMENTS

| | | | |
|---|---|---|---|
| 3,229,441 | 1/1966 | Heffner | 264/46.6 X |
| 3,366,718 | 1/1968 | Komada | 264/46.9 X |
| 3,392,220 | 7/1968 | Jennings | 264/46.5 |
| 4,136,141 | 1/1979 | Bauer et al. | 264/45.2 |
| 4,269,890 | 5/1981 | Breitling et al. | 264/45.2 X |
| 4,372,028 | 2/1983 | Clark et al. | 264/46.9 X |
| 4,447,377 | 5/1984 | Denton | 264/45.2 |

Primary Examiner—David A. Simmons
Assistant Examiner—Allan R. Kuhns
Attorney, Agent, or Firm—Austin R. Miller

[57] ABSTRACT

A water heater including a water tank having a jacket surrounding the tank and providing an insulation space therebetween. A plurality of serial foam injections are introduced into the space to fill the space between the tank and the jacket.

17 Claims, 2 Drawing Sheets

METHOD OF MAKING A FOAM INSULATED WATER HEATER

BACKGROUND OF THE INVENTION

1. Field of the Invention

The present invention relates to foam insulated water heaters and methods of making same. More particularly, the present invention relates to a method of insulating a water heater tank with an expandable foam insulation material such as polyurethane foam.

2. Description of the Art

The advantage of using rigid polyurethane foam insulation in water heater construction has been recognized for several years. For example, the heat conductivity of polyurethane foam is lower than that of fiberglass, thereby providing superior insulation properties. Thus, it is possible to obtain the same insulation properties utilizing a substantially reduced insulation wall thickness, as compared to conventional insulation materials, such as fiberglass. This results in water heaters having a reduced size thereby providing lower packaging and shipping costs.

In addition, the rigidity of the foam insulation, when compared with that of fiberglass, provides improved resistance to dents in the exterior jacket of the tank. This factor permits the use of less sophisticated (and therefore less expensive) shipping containers.

Although the superior insulating properties of expandable foam materials such as polyurethane have been well recognized for many years, the use of foam as an insulating material in water heaters has been to date quite limited. This is due at least in part to the production problems encountered using expandable foam materials. One of the major problems associated with water heater manufacturing, and particularly the production of foam insulated water heaters, has been the method by which the foam insulation layer is formed about the tank. Generally, the foam is injected as a liquid which continually expands and eventually sets into a rigid foam layer. Usually the liquid foam is injected into the annular space between the inner tank and the outer jacket. Unfortunately, the liquid foam has a tendency to leak out of any small openings such as those in the seams of the outer jacket. In addition, the sides of the tank generally are provided with openings such as a drain opening or with valves such as a temperature and pressure release valve. Also attached to the sides of the tank are electric controls and other components such as thermostats. In the past, it has been a serious problem in preventing these openings and components from becoming covered with foam, interfering with subsequent servicing, repair, adjustment, etc.

One way of shielding these areas from the expanding foam has been to tightly pack the regions surrounding the nipples and controls with fiberglass insulation material. The fiberglass insulation material then serves as a "foam dam" during the foaming operation.

Other processes utilize a plastic bag filled with the expanding foam material, the bag being positioned around the tank. In U.S. Pat. No. 4,372,028 the liquid foam material is first injected into a bag. The bag is then sealed and positioned circumferentially or longitudinally about the tank. The bag may have welded cut out openings which fit over any components attached to the exterior wall of the tank. Because the foam is wholly contained within an enclosed plastic bag, there is no danger of the foam leaking into unwanted areas. Once the foam within the bag expands sufficiently, it forms an effective dam about the electrical control or other areas. Subsequently, the remaining annular space between the tank and the outer jacket may be foamed in a single or in several steps.

U.S. Pat. No. 4,447,377 utilizes another type of plastic bag used in foam insulated water heaters. The bag has a shape which may extend substantially around the entire circumference of the tank. The bag is first positioned around the tank and then the outer jacket is positioned around the bag. Cut out weld holes may be provided in the bag and positioned about any components such as electrical controls, thermostats, drain lines, etc. The top pan is then positioned over the jacket and foam is injected (through an opening in the top pan) into the bag. Since the expanding foam is wholly contained within the bag, there is no danger of unwanted foam leakage.

A second major problem associated with the production of foam insulated water heaters concerns the method by which the foam insulation layer is injected. Although many kinds of foamable materials can be used to insulate water heaters, two kinds which are readily available on a commercial basis are HPIM (High Pressure Impingement Mixing) foams and low pressure frothing foams. In both of these types of foam systems, two components, typically an isocyanate component and a resin component are mixed immediately prior to injection into the annular space. In addition, the low pressure frothing foam system injects a gas such as FREON into the liquid component mixture just prior to injection. In both of the above-mentioned foam systems and in many other foam systems as well, the foam is typically injected in a single shot into the annular space between the tank and the outer jacket. A typical single shot may take anywhere from a fraction of a second to several seconds depending upon the type of foam injected and the volume of the annular space. The foam nozzle is stationary during the foam injection step so that all of the foam material is injected in a rather localized portion of the annular space. This localized injection of the foamable liquid, and its subsequent foaming action, has a tendency to push the tank and the outer jacket off center with respect to one another and in some extreme cases to cause bulging to occur in the outer jacket adjacent the foam injection site.

The single injection foaming also tends to generate more severe pressures, as the foam expands, which can cause distortions in the shape of the outer jacket, foam leakage and in severe cases can even effect the alignment of openings in the outer jacket with components, such as electric thermostats, positioned on the outside of the water tank.

It has now further been discovered that remarkable advantages are achieved by providing a plurality of serial injections of the foam insulation material into the annular space between a hot water tank and the outer jacket.

SUMMARY OF THE INVENTION

These and other objects of the present invention are met by a method of making a water heater including a tank and an outer jacket surrounding the tank and spaced therefrom in order to provide an annular space therebetween, wherein a foam insulating material is provided in the annular space, and wherein the foam insulating material is formed by injecting a plurality of serial shots of an expandable foam, such as liquid polyurethane foam, into said annular space.

The multiple shot foam injection methods of the present invention can be used in both electric and gas water heaters. Furthermore, the multiple shot foaming methods can be used in water heaters having no envelope, bag, fiberglass dam, or apron as well as in water heaters having an envelope(s), bag(s) and/or apron(s).

Figure 1:
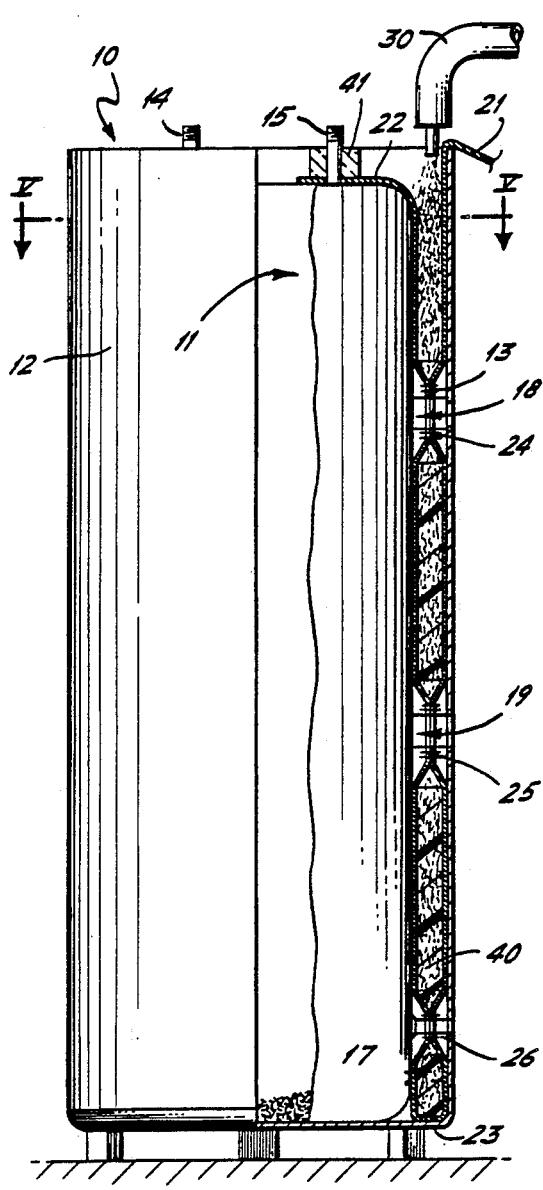
FIG. 1 is a side elevational view, shown partly in section, of a water heater including a water tank and an outer jacket with an apron during an initial foam injection step in accordance with this invention.

Although specific forms of apparatus embodying the invention have been selected for illustration in the drawings, and specifically a plastic apron has been chosen for illustrating the foaming methods, and although specific terminology will be resorted to in describing those forms in the specification which follows, their use is not intended to define or limit the scope of the invention which is defined in the appended claims. Although an electric water heater has been selected for illustration as a matter of convenience, the invention applies as well to gas heaters or any others.

DESCRIPTION OF THE PREFERRED EMBODIMENTS

Figure 4:
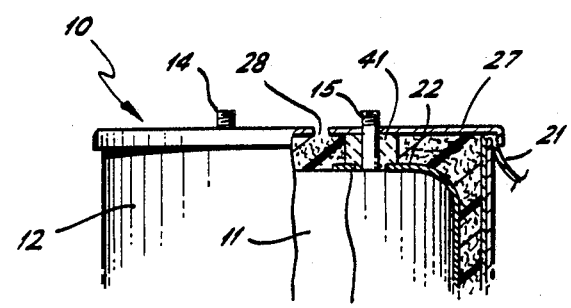
FIG. 4 is a side elevational view, shown partly in section, of a top portion of the heater shown in FIG. 1 with a top cover secured in place.

Referring to the drawings wherein like reference numerals refer to the same features in the several drawings, and especially referring to FIG. 1, there is shown electric water heater 10. Water heater 10 consists of a water tank 11 having a cold water inlet nipple 14 and a hot water outlet nipple 15. Nipples 14, 15 are each surrounded with a block 41 of fiberglass or other insulating material in order to effectively prevent the injected foam from leaking through the openings (provided for the nipples 14, 15) in the top pan 27 (shown only in FIG. 4). Surrounding tank 11 is outer jacket 12, typically constructed of sheet metal. The diameter of jacket 12 is greater than the diameter of tank 11, thereby creating an annular insulating space 13 therebetween.

Electric water heater 10 is provided with a number of components on the exterior wall of the tank 11. For instance, near the bottom of the tank 11 there is provided a drain opening 17. In addition, components 16a, 16b are attached to the side wall of tank 11 at areas 18, 19, respectively. Components 16a, 16b appear in FIG. 2 but have been deleted from FIG. 1 for ease of illustration. Typically, components 16a, 16b comprise electrical control components such as thermostats or similar devices. However, other types of components may also be positioned on the outer wall of tank 11, such as temperature and pressure release valves or other types of electrical control equipment.

It is important for purposes of proper operation and maintenance of components 16a, 16b that they be effectively shielded from the injected foam insulation material 40. Apron 20 comprises one of a number of means which may be used to provide a dam around components 16a, 16b and drain 17 during foaming of water heater 10. Although the following description will be directed specifically to a foaming operation utilizing apron 20, those skilled in the art will appreciate that the multiple shot foaming methods of the present invention may be used equally as well with water heaters containing no apron, sleeve, bag or envelope, with water heaters containing fiberglass dams as well as with water heaters containing a bag(s), sleeve(s) or envelope(s).

Apron 20 comprises a pair of flexible sheets 21, 22 covering only a limited area of the tank 11 at the foam injection site. Flexible sheets 21, 22 are preferably composed of a flexible, water-tight material which serves to contain and distribute liquid foam 40. Typically, apron 20 is composed of a plastic sheet such as polyethylene.

Apron 20 has a length which is somewhat longer than the height of tank 11, but is much narrower than the circumference of tank 11. Furthermore, the sides of apron 20 are open to permit expanding foam to flow circumferentially without confinement by the apron 20. In the particular embodiment of apron 20 illustrated in FIG. 2 (with the outer jacket 12 removed for ease of illustration) the apron 20 has a width equal to about one-half the circumference of tank 11. However, in many cases the width of the apron 20 may be substantially less than that shown in FIG. 2. In certain cases, the width of the apron 20 may be even less than 25% of the circumference of the tank 11.

Apron 20 is provided with a number of cut out openings 24, 25, 26 defined by weld lines, along which weld lines the flexible sheets 21, 22 are welded together. The positions of openings 24, 25 and 26 correspond to the positions of components 16a, 16b and drain opening 17, respectively.

In the manufacture of the foam insulated water heater 10, apron 20 is appropriately secured, preferably with a sprayed adhesive, on tank 11 so that components 16a, 16b and drain opening 17 are positioned within the cut out openings 24, 25, 26, respectively. Alternatively, the inner flexible sheet 22 may be pressed over hot water outlet nipple 15 so that the apron 20 securely hangs on tank 11. Appropriate openings or slits in flexible sheet 22 may be provided in order to facilitate the hanging of the apron 20 on nipple 15.

Prior to the foam injection steps, tank 11 is preferably heated to a temperature of about 5°–10° F. higher than the temperature of the foamable liquid components. The tank 11 preheating step is strictly a preferred step which aids in the foaming and maturing of certain foamable materials.

As a further step, outer jacket 12 is placed over apron 20 and tank 11. Once the outer jacket 12 is secured, the upper end of flexible sheet 21 is pulled outwardly over the top edge of jacket 12.

An expandable foam insulation material 40 is then injected into the space between the tank and the jacket, under control of the apron 20. This is accomplished by introducing the liquid foam components through an injection nozzle 30, which extends into the apron 20, in two or more shots. The combined amount of expandable liquid foam material injected may be predetermined depending upon the size of the cavity 13, the type of foam, etc.

Figure 2:
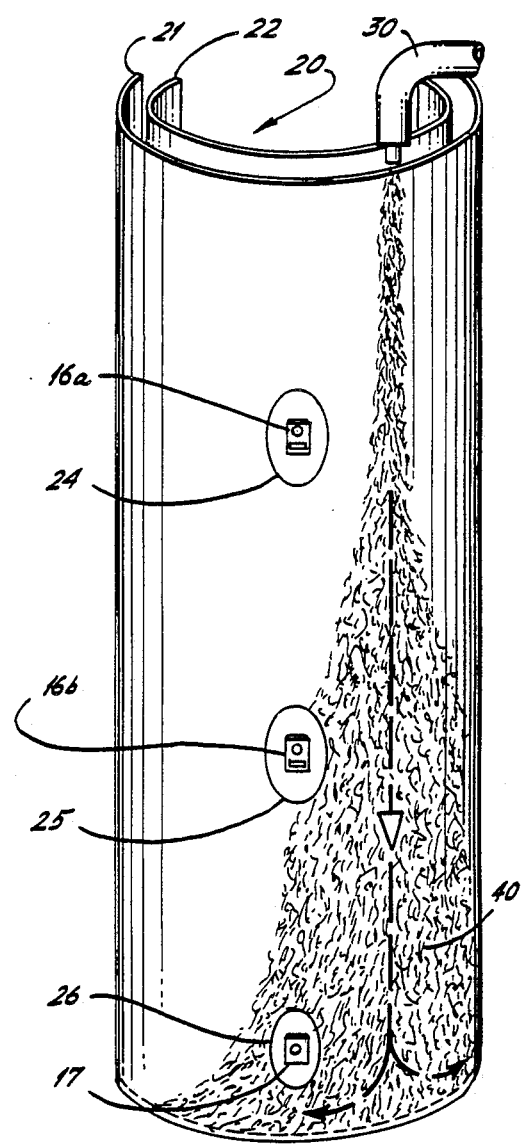
FIG. 2 is a side elevational view of a water tank with an apron, with the outer jacket removed for ease of illustration, during an initial foam injection step.
Figure 3:
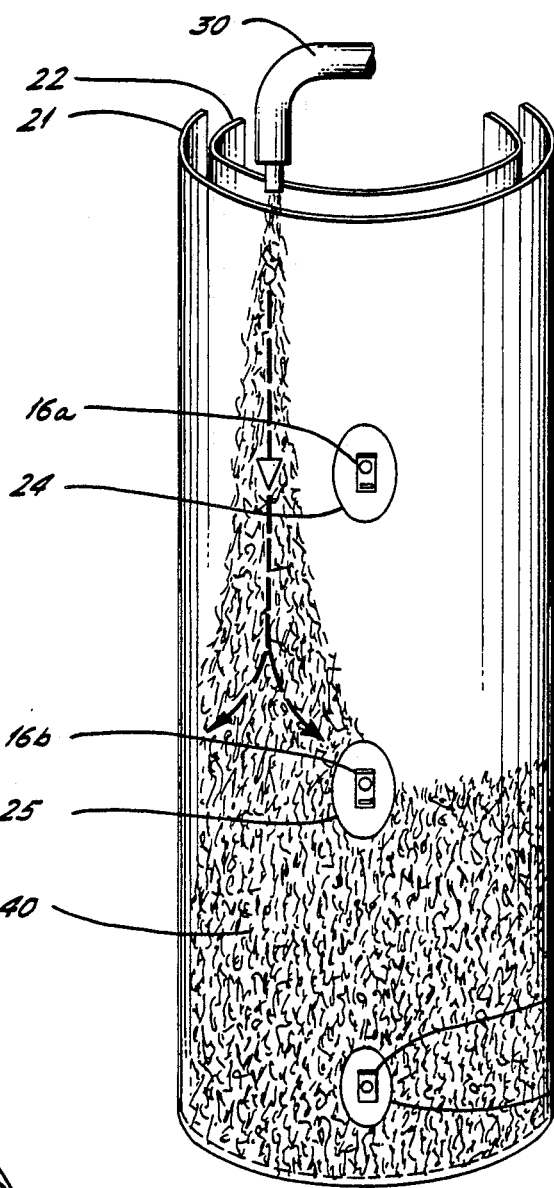
FIG. 3 is a side elevational of the water tank and apron shown in FIG. 2 during a subsequent foam injection step.

Referring to FIGS. 2 and 3, there is illustrated a two-shot foaming method. FIG. 2 shows the first foam shot through nozzle 30 wherein the foam 40 is injected between sheets 21 and 22. Typically, openings 24, 25 are provided at a central portion of apron 20. The first injection of foam 40 is made slightly off center with respect to apron 20 as shown in FIG. 2. As the foam is injected, it is freely flowable and typically falls to the bottom of apron 20. Since the bottom edges of flexible sheets 21, 22 are joined along seam 23 (typically a heat welded seam) the foam 40 flows outwardly to either side as shown by the arrows. The first foam injection typically takes anywhere from a fraction of a second to several seconds, depending upon the type of foam and the size of the cavity. For the initial foam injection step, it is preferable to foam under free rise conditions i.e., lower pressures, preferably $\leq 1.0$ psig, as will be described in more detail hereinafter.

As is clearly shown in FIG. 2, the side edges of flexible sheets 21, 22 are not sealed together. However in other embodiments, the sides of the flexible sheets may be joined for a short distance (about 6") adjacent their bottom edges. In either case, the side edges of sheets 21, 22 remain substantially unsealed. Thus, as the foam 40 is injected into apron 20 it is not confined by the apron 20 but is directed by the apron 20 to flow in a circumferential direction as the foam is generated. As more foam 40 is injected into apron 20, and as it begins to expand and to increase in viscosity, the foam 40 is forced out through the open sides of apron 20. However, by the time the foam 40 begins to flow out of the apron 20, it has already increased in viscosity and begun to set and is too viscous to present a danger of substantial leakage through small cracks or openings in the outer jacket 12. Furthermore, because of the cut out seams 24, 25 and 26, the liquid foam 40 is effectively dammed from the areas containing components 16a, 16b and drain opening 17.

After the injection of the first foam shot, the nozzle 30 may be moved to the position illustrated in FIG. 3. In the alternative, a second foam nozzle can also be used. Two foam nozzles are especially preferred when two different types of foams are injected in the first and second foam injection steps. In any event, there is typically a time period of 5-300 seconds between the first injection and the second injection in order to allow the foam injected in the first shot to reach a solid state. This time period is typically referred to as the foam's "gel time" or "string time" which will, of course, vary upon the particular foam used to insulate water heater 10. The amount of foam injected in the first shot is purposefully predetermined to be insufficient to foam and occupy the entire annular space 13. This, combined with the fact that the first shot is made before the top pan 27 is secured over the outer jacket, ensures that the foam injected during the first injection will be subjected to lower pressure (since the foam is not expanding within a closed container) as it foams, thereby resulting in the formation of a lower density foam having good structural strength properties. FIG. 3 clearly illustrates that at the time of the second foam injection, the earlier injected foam 40 has expanded to completely surround the lower $\frac{1}{3}-\frac{1}{2}$ of tank 11. Thus, at the time of the second foam injection step, the outer jacket 12 is secured with respect to tank 11 by reason of the low density high structural strength foam material injected in the first injection step.

FIG. 3 clearly illustrates the second foam injection step through nozzle 30. The second foam shot is also made between sheets 21 and 22, slightly off center with respect to apron 20 as shown in FIG. 3.

The foam which is injected in the second injection step may be of the same or different type from the foam injected during the first injection step.

In the case of a two shot foaming method using the same kind of foam in both shots, the top pan 27 is immediately secured over the outer jacket 12 upon completion of the second shot. This ensures that the foam injected in the second shot will be expanding within a closed container and will, therefore, be subjected to higher pressures as it foams. This causes the foam injected in the second shot to form a denser foam than the free rising foam injected in the first shot. Having a higher density foam surrounding the upper $\frac{1}{2}-\frac{2}{3}$ portion of tank 11 is preferable from a heating efficiency standpoint since denser foam tends to have better insulating properties. Furthermore, the upper portions of water tank 11 tend to experience the greatest heat loss so it is desirable to have higher density foam surrounding these heat loss prone areas.

Figure 5:
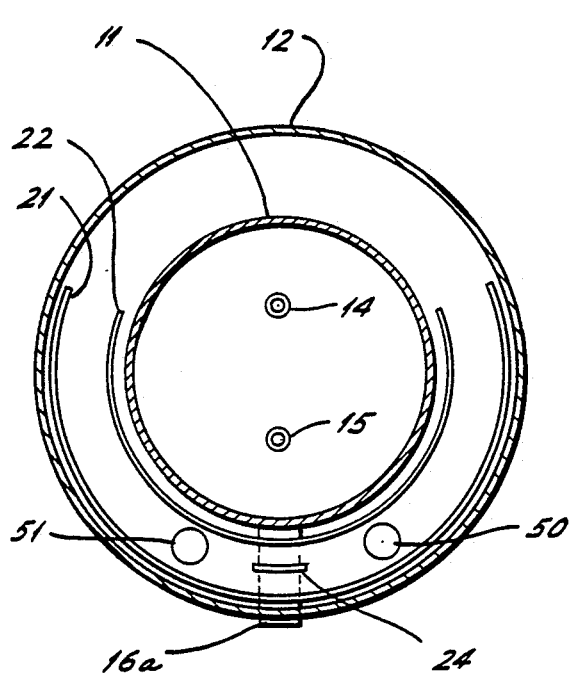
FIG. 5 is a sectional view of the water tank and apron shown in FIG. 1 taken along lines V—V, illustrating the relative locations of the foam injection sites illustrated in FIGS. 2 and 3.

Referring to FIG. 5 of the drawings, there is shown a sectional view of the water heater 10 illustrated in FIG. 1 looking towards the bottom of heater 10. FIG. 5 clearly illustrates the first and second foam injection sites 50, 51, respectively. Sites 50, 51 are separated by about a 60° arc along the circumference of the apron 20. Injection sites 50, 51 are preferably equally spaced from the center portion of the apron 20.

It has surprisingly been discovered that using two, three, four or more foam injection steps results in a more uniform cell structure in the matured foam resulting in better insulation properties. In addition, it has also surprisingly been discovered that less foam material needs to be injected into the annular space when using two or more shots of foam resulting in savings of approximtely $\frac{1}{2}$ lb. of foam material for a 50 gallon size tank. This is true even in cases where the multiple shots are all of the same kind of foam.

It is well within the scope of the present invention to provide each shot of foam through a plurality of foam injection nozzles. For instance, it is possible to position a plurality of nozzles 30 around the circumference of tank 11 so that there will be two or more foam injection sites in each of the plurality of "shots".

In addition, it is well within the scope of the present invention to use foams having different densities in different shots.

Those persons skilled in the art will readily appreciate that the multiple shot foaming methods of the present invention may be utilized in any number of ways to provide different foams having specific desired properties within different portions of annular space 13. For instance, in the case of gas water heaters there are certain portions of the annular space, specifically those surrounding the combustion chamber and those surrounding the flue pipe, which become much hotter than other portions of the tank. It is possible using the foaming methods of the present invention to provide a foam insulation material having exceptional burn resistance properties in these high temperature areas. In addition, other foam properties such as structural strength, foaming pressure, insulation value as well as many other properties may be selectively used in the multiple shot foaming methods of the present invention in order to "customize" the various portions of the annular space 13 surrounding tank 11.

Thus, it is possible to provide foams having better insulating properties adjacent more critical areas such as those near the heating elements. In addition, low pressure foaming used in the initial foam injection shot relieves the problems encountered in the prior art wherein the tank and the outer jacket tended to be pushed off center with respect to one another.

It will be appreciated that wide varieties of foams may be utilized in the practice of this invention. Self-foaming materials may be used, in which the foaming process occurs from chemical reactions brought about by merely mixing the foam producing components with each other. In other forms the foam is created by high pressure gas injection, or other means. In any event, the foaming material tends to be highly flowable and of relatively low viscosity during the initial stages of its formation and to become less flowable and of higher viscosity as the reactions proceed, ultimately setting up completely as a solid and rigid foam block.

Once the last injection of foam 40 has been made and the top cover 27 has been secured to the jacket 11, the foam 40 is allowed to expand and set. This procedure typically takes several minutes. The progress of the expansion of the foam 40 may be determined by providing a suitable hole in the top cover 27. This hole 28 also provides a suitable escape outlet for gases displaced by the expanding foam 40. Once the foam 40 has expanded to fill the entire space 13 surrounding the tank 11, the hole 28 may be plugged in a known manner.

Alternatively, the top cover 27 may be installed on the outer jacket 12 before the foaming steps. In such a case, the foam 40 is injected through a plurality of suitable holes provided in the top cover. Likewise, in this alternative procedure, the expansion of the foam 40 may be observed through the hole in the top cover which is later plugged at a suitable time.

Although this invention has been described in the specification with reference to specific forms thereof, it will be appreciated that a wide variety of equivalents may be substituted all without departing from the spirit and scope of the invention as defined in the appended claims.

I claim:

1. In a method of insulating a water heater with an expandable foam insulating material, said heater including a cylindrical tank and a cylindrical jacket having a greater diameter than the tank, the steps comprising:
    a. securing the jacket around the tank with substantially uninterrupted annular free space between them, said space being open at the top of the tank;
    b. introducing in separate and distinct steps a plurality of quantities of an expandable foam insulating material into the open free space, including an initial quantity which is insufficient to fill said free space and a subsequent quantity which is sufficient substantially to fill said space, said initial quantity being permitted to expand circumferentially around a lower portion of the tank under free rise conditions; and
    c. thereafter closing off said open annular free space after introduction of said subsequent quantity, and before said subsequent quantity has finished expanding upwardly and around the tank, whereby the foam so introduced expands circumferentially around the tank to fill said space and form solidified foam under pressure.

2. The method according to claim 1, wherein the foam comprises polyurethane.

3. The method according to claim 1, wherein the heater is an electric water heater.

4. The method according to claim 1, wherein two serial injections of said expandable foam insulating material are introduced into the space.

5. The method according to claim 1, wherein each of the plurality of injections is made through a single foam injection nozzle.

6. The method according to claim 1, wherein at least one of the injections is made through a plurality of foam injection nozzles.

7. The method according to claim 1, wherein there is provided a period of delay between a first and second injection.

8. The method as defined in claim 7, wherein the period of delay is in the range of about 5-300 seconds.

9. The method according to claim 1, wherein the foam is subjected to pressures $\leq$ about 1.0 psig.

10. The method according to claim 1, wherein a second injection of an expandable foam insulating material comprises injecting a foamable material which is subjected to higher pressures than those subjected to the first foam injection.

11. The method as defined in claim 1, wherein the plurality of serial injections are made into a plastic apron having a cut out opening therein.

12. The method according to claim 11, wherein two serial injections are made on either side of the cut out opening.

13. The method according to claim 1, wherein different foams having selected physical properties are injected into different portions of said space in said serial injections.

14. The method according to claim 1, wherein one shot of foam is caused to expand with the cover off and wherein a subsequent shot of foam is injected with the cover off and the cover is affixed to the jacket to enclose the space while the foam of the subsequent shot is still expanding in said space.

15. The method according to claim 1, wherein the tank is preheated to a temperature of about 5°-10° F. higher than the temperature of the foamable liquid components.

16. The method according to claim 1, wherein said serial injections include one injection step wherein the foam-forming process is continued until the foam has at least begun to set, and another injection step performed after said foam from said one injection step has at least begun to set.

17. In a method of insulating a gas fired water heater having a gas burner at a lower portion thereof and having a cylindrical tank and a cylindrical jacket of greater diameter than said tank, the steps comprising:
    a. positioning the jacket around the tank with an open and free annular space between them,
    b. introducing into said open free space a foam insulation material having exceptional burn resistance at a lower portion of said space in the vicinity of said gas burner and permitting said foam insulation material to expand circumferentially around said lower portion under free rise conditions,
    c. limiting the amount of said burn-resistant foam to fill less than all of said free annular space,
    d. introducing in a separate and distinct step a different foam-forming material into said free space above said burn-resistant foam material, and e. thereafter closing off said open annular free space after introduction of said different foam forming material, and before said different material has finished expanding upwardly and around the tank, whereby the material so introduced expands circumferentially around an upper portion of the tank to fill said space and form solidified foam under pressure.

* * * * *